(12) United States Patent
Koufogiannakis et al.

(10) Patent No.: US 10,417,238 B2
(45) Date of Patent: Sep. 17, 2019

(54) CONTEXTUAL ENTITY ANALYSIS FOR ELECTRONIC CONTENT DELIVERY ACROSS A COMPUTER NETWORK

(71) Applicant: Microsoft Technology Licensing, LLC, Redmond, WA (US)

(72) Inventors: Christos Koufogiannakis, Belmont, CA (US); Daniel Francis, Belmont, CA (US); Hardik Bati, Santa Clara, CA (US); John Moore, San Francisco, CA (US); Wenjun Wu, San Jose, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 518 days.

(21) Appl. No.: 15/224,012

(22) Filed: Jul. 29, 2016

(65) Prior Publication Data
US 2018/0032583 A1 Feb. 1, 2018

(51) Int. Cl.
*G06F 16/00* (2019.01)
*G06F 16/2457* (2019.01)
*G06Q 30/02* (2012.01)
*G06F 16/951* (2019.01)
*H04L 29/08* (2006.01)

(52) U.S. Cl.
CPC ...... *G06F 16/24575* (2019.01); *G06F 16/951* (2019.01); *G06Q 30/0269* (2013.01); *H04L 67/306* (2013.01)

(58) Field of Classification Search
CPC .................................................. G06F 16/24575

USPC ................................................... 707/732, 723
See application file for complete search history.

(56) References Cited

U.S. PATENT DOCUMENTS

| | | | | |
|---|---|---|---|---|
| 2012/0041834 | A1* | 2/2012 | McRae, II | G06Q 30/02 705/26.3 |
| 2014/0114965 | A1* | 4/2014 | Balduzzi | G06Q 50/10 707/723 |

OTHER PUBLICATIONS

"International Search Report and Written Opinion Issued in PCT Application No. PCT/US2017/044558", dated Oct. 13, 2017, 11 Pages.

* cited by examiner

*Primary Examiner* — Chelcie L Daye
(74) *Attorney, Agent, or Firm* — Hickman Palermo Becker Bingham LLP; Daniel D. Ledesma

(57) ABSTRACT

Techniques for responding to content requests that originate from remote computing devices are provided. In one technique, a content request that includes a viewer identifier of a user that requested web content and a contextual entity identifier of an entity that is referenced in the web content is received. In response to receiving the content request, based on the viewer identifier, first profile data about a viewer associated with the viewer identifier is retrieved. Also, based on the contextual entity identifier, second profile data about the entity is retrieved. Based on the first profile data and the second profile data, a content delivery campaign is identified. Particular content to deliver is determined based on the content delivery campaign. The particular content is sent to a computing device that initiated the content request.

20 Claims, 15 Drawing Sheets

CONTEXTUAL ENTITY ANALYSIS FOR ELECTRONIC CONTENT DELIVERY ACROSS A COMPUTER NETWORK

TECHNICAL FIELD

The present disclosure relates to identifying contextual entities within electronic content in order to dynamically identify relevant content items for transmission across a computer network. SUGGESTED ART UNIT: 2161; SUGGESTED CLASSIFICATION: 707/728.

BACKGROUND

The Internet has enabled the delivery of electronic content to billions of people. Sophisticated techniques have been explored and implemented to identify content that is relevant to viewers that are requesting other content. Such techniques may involve hundreds and thousands of computations that occur for a single request. If processing a content request takes longer than a certain amount of time, then poor user experience results and content providers will choose other content exchanges to delivery their respective content. Thus, efficient processing of content requests from remote computing devices and efficient transmission of any results of the content requests is critical.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 8A-8B are example screenshots that each depict, within a profile context, a content item that is based on a contextual entity, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for identifying relevant content items to transmit to end-users are provided. In one technique, a contextual entity referred to within web content is determined, a content item that is relevant to the contextual entity is identified, and the content item is transmitted, over a network, to a viewer of the web content, to be displayed with the web content. Examples of contextual entities include users, organizations, groups, articles, and events. If a content item is determined based not only attributes of the viewer but also on attributes of what the viewer is viewing, then the content item is much more likely to be relevant to the viewer and more likely that the viewer will interact with the content item.

System Overview

Figure 1:
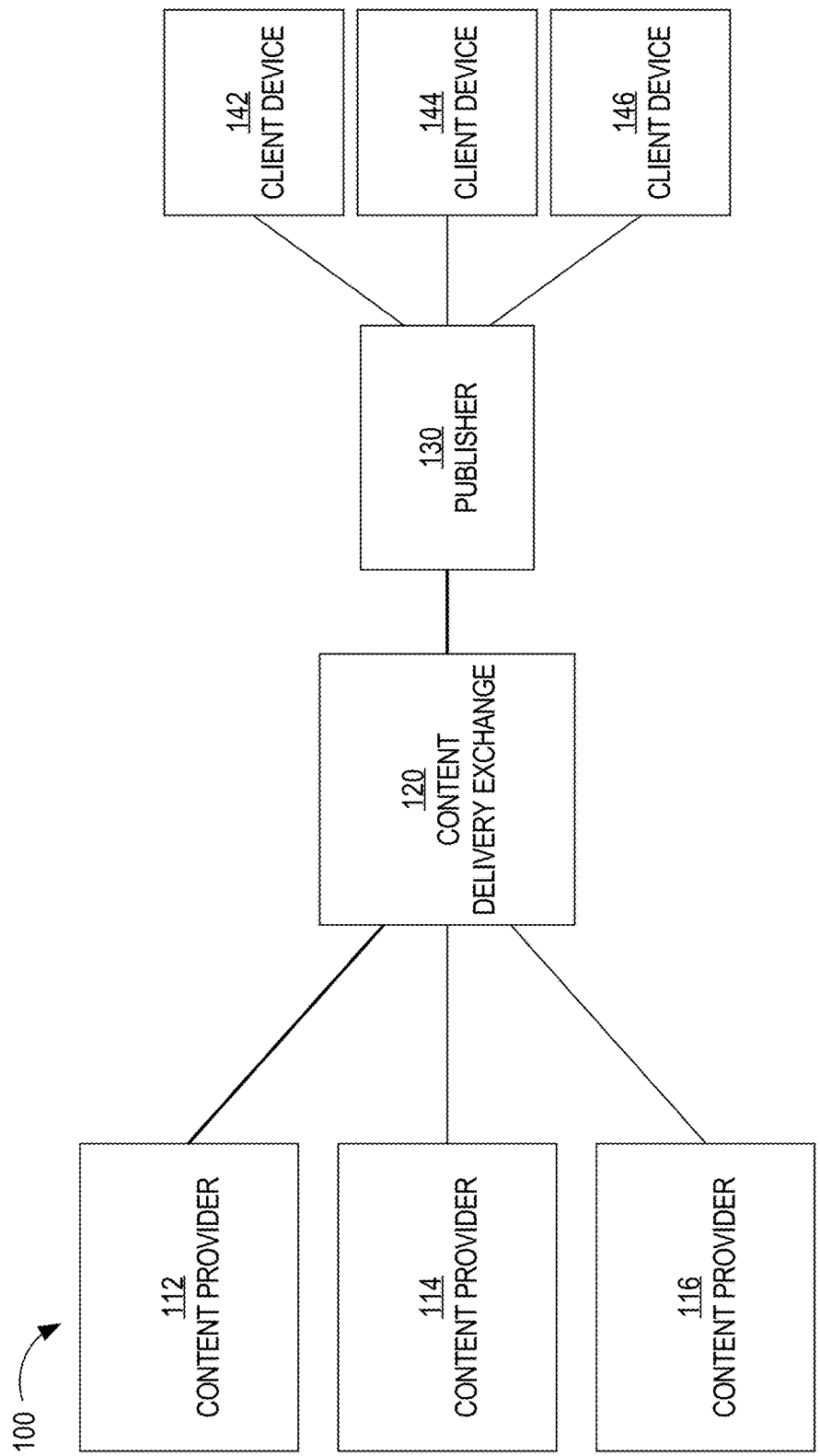
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery exchange 120, a publisher 130, and client devices 142-146. Although three content providers are depicted, system 100 may include more or less content providers. Similarly, system 100 may include more than one publisher and more or less client devices.

Content providers 112-116 interact with content delivery exchange 120 (e.g., over a network, such as a LAN, WAN, or the Internet) to enable content items to be presented to end-users operating client devices 142-146. Thus, content providers 112-116 provide content items to content delivery exchange 120, which in turn selects content items to provide to publisher 130 (or directly to client devices 142-146) for presentation to users of client devices 142-146. However, at the time that content provider 112 registers with content delivery exchange 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery exchange 120.

Publisher 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher 130 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 130 provides the requested content (e.g., a web page) to the client device.

Simultaneously or immediately before or after the requested content is sent to a client device, a content request is sent to content delivery exchange 120. That request is sent (over a network, such as a LAN, WAN, or the Internet) by publisher 130 or by the client device that requested the original content from publisher 130. For example, a web page that the client device renders includes one or more calls (or HTTP requests) to content delivery exchange 120 for one or more content items. In response, content delivery exchange 120 provides (over a network, such as a LAN, WAN, or the Internet) one or more particular content items to the client device directly or through publisher 130. In this way, the one or more particular content items may be presented (e.g., displayed) concurrently with the content requested by the client device from publisher 130.

Content delivery exchange 120 and publisher 130 may be owned and operated by the same entity or party. For example, content delivery exchange 120 and publisher 130 are both owned and operated by LinkedIn. Alternatively, content delivery exchange 120 and publisher 130 are owned and operated by different entities or parties. For example, content delivery exchange 120 is owned and operated by LinkedIn and publisher 130 is owned and operated by CNN.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 120, and that bids for space (on one or more publishers, such as publisher 130) to present content items on behalf of multiple content providers. Thus, a bidder is another source of content items that content delivery exchange 120 may select for presentation through publisher 130. Thus, a bidder acts as a content provider to content delivery exchange 120 or publisher 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery exchange 120. A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select or click on the set of content items, or when a certain number of users purchase a product/service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, residence information, job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 120 receives, from a computing device, a request that does not satisfy the targeting criteria, then content delivery exchange 120 ensures that any content items associated with the particular content delivery campaign are not sent to the computing device.

Instead of one set of targeting criteria, the same content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher 130 may not satisfy targeting criteria of one content item of a campaign, the same content request may satisfy targeting criteria of another content item of the campaign.

Different content delivery campaigns that content delivery exchange 120 manages may have different compensation schemes. For example, one content delivery campaign may compensate content delivery exchange 120 for each presentation of a content item from the content delivery campaign (referred to herein as cost per impression or CPM). Another content delivery campaign may compensate content delivery exchange 120 for each time a user interacts with a content item from the content delivery campaign, such as selecting or clicking on the content item (referred to herein as cost per click or CPC). Another content delivery campaign may compensate content delivery exchange 120 for each time a user performs a particular action, such as purchasing a product or service, downloading a software application, or filling out a form (referred to herein as cost per action or CPA). Content delivery exchange 120 may manage only campaigns that are of the same type of compensation scheme or may manage campaigns that are of any combination of the three types of compensation scheme.

Tracking User Interaction

Content delivery exchange 120 tracks one or more types of user interaction across client devices 142-146. For example, content delivery exchange 120 determines whether a content item that exchange 120 delivers is displayed by a client device. Such a "user interaction" is referred to as an "impression." As another example, content delivery exchange 120 determines whether a content item that exchange 120 delivers is selected by a user of a client device. Such a "user interaction" is referred to as a "click." Content delivery exchange 120 stores such data as user interaction data, such as an impression data set and/or a click data set.

For example, content delivery exchange 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a client device that displayed the specific content item, and/or a user identifier of a user that operates the client device. Thus, if content delivery exchange 120 manages multiple content delivery campaigns, then different impression data items may be associated with different content delivery campaigns. One or more of these individual data items may be encrypted to protect the privacy of the end-user.

Similarly, a click data item may indicate a particular content delivery campaign, a specific content item, a date of user selection, a time of the user selection, a particular publisher or source (e.g., onsite v. offsite), a client device that displayed the specific content item, and/or a user identifier of a user that operates the client device.

Content Delivery Channels

A content delivery channel is a source of content requests, regardless of where content delivery exchange 120 actually receives the content requests. Thus, content delivery exchange 120 may receive all content requests through the same set of ports or computing devices but the sources of those content requests may be different. For example, one source of content requests may be a social networking platform (which may be shared with content delivery exchange 120) from which the content requests originate. Such a source may be considered an "onsite" source or content delivery channel. Another source of content requests may be any publisher or other content exchange that transmits content requests to content delivery exchange 120. Such sources may be considered an "offsite" sources or content delivery channels. Examples of specific offsite content delivery channels include any publisher (e.g., Facebook, a news website) or another content exchange that interacts directly with one or more publishers. As another example, "source" may refer to a segment of a target audience. For example, one source of content requests is a set of members of a social networking service who satisfy certain criteria (e.g., they are classified as business professionals) while another source of content requests is a set of members of the social networking service who do not satisfy the certain criteria.

Additionally or alternatively, a content delivery channel is a communication channel through which content requests are received. For example, one content delivery channel comprises a first set of one or more computing (e.g., server) devices through which content requests are received while another content delivery channel comprises a second set of one or more computing devices through which content requests are received. As another example, one content delivery channel comprises a first set of one or more (computer) ports (on one or more computing devices) through which content requests are received while another content delivery channel comprises a second set of one or more ports (on the same or different one or more computing devices) through which content requests are received. In a related embodiment, content requests from different sources are received through or at different ports and/or computing devices. For example, content requests from one source are received through one set of ports and content requests from another source are received through another set of ports.

An offsite source may not guarantee the delivery of a content item that content delivery exchange 120 transmits to the offsite source in response to a content request from the offsite source. In this scenario, content delivery exchange 120 acts as a bidder. The offsite source may receive multiple content items from multiple bidders (content delivery exchange 120 being one of them) and choose only a subset (e.g., one content item) to deliver to a computing device of an end-user, which computing device initiated the content request to content delivery exchange 120.

Contextual Entities

A contextual entity is an entity, where data about the entity is either currently displayed on a client device or was recently requested (e.g., by the client device or by an intermediary between the client device and content delivery exchange 120, such as publisher 130). For example, a viewer requests a profile page of another user. The contextual entity is the other user. As another example, a viewer requests a profile page of a company; thus, the contextual entity is the company. As another example, a viewer requests a view of messages that have been sent between the viewer and another user. The contextual entity is the other user.

Examples of types of entities include users, organizations (e.g., companies, government organizations, academic institutions, charities), groups (e.g., of users and/or of organizations) articles, posts, events (e.g., tech conferences, musical performances, sports events, etc.), a slideshow presentation (e.g., a PowerPoint presentation), learning content (e.g., Lynda.com or SlideShare), and shared content (e.g., an article from another publisher).

Entity Profiles

The types of data in a profile of an entity may vary from entity type to entity type. For example, a company profile may include location information (e.g., a mailing address of each company office), contact information (e.g., a phone number or email address), size information (e.g., number of employees; percentage growth in number of employees), financial information (e.g., current stock price, revenue and/or profit in the last quarter and/or year, revenue growth in the last year), job information (e.g., one or more job openings and requirements for each), and rating information (e.g., by other organizations or users, or derived based on certain metrics, such as number of likes or number of users following the company).

A profile of an academic institution (e.g., a university, a liberal arts college, a technical institute, a provider of online courses, a community college, a high school, an elementary school) may include a name of the academic institution, location information, contact information, size information (e.g., number of students enrolled), application information (e.g., number of applications received/accepted), financial information (e.g., if it is a public institution), sports information (e.g., name and number of sports sponsored by the academic institution), degree information (e.g., number and types of degrees; number of students pursuing each degree), award information (e.g., awards received by instructors/professors and/or received by students and/or graduates of the academic institution), cost information (e.g., tuition, room and board, and food costs), graduate information (e.g., percentage of graduates that find work within 6 months after graduation), and rating information.

A profile of a group may include date information (e.g., when the group was formed and by whom), location information, contact information, size information (e.g., number of users and/or organizations in the group; percentage change in size of the group over a period of time indicating a growth rate), event information (e.g., of past and/or future events), and/or charitable information (e.g., where and/or how to donate money or time).

A profile of an article contains data about the article, such as one or more authors or contributors to the article, date/time of the article's posting, the number of times the article has been displayed, the number of times the article has been selected, viewed, shared, and/or saved by users, the number of times the article has been "liked," the number of comments (provided by readers of the article) to the article, the number of comments from readers who satisfy certain criteria (e.g., having over a certain number of connections or having a certain classification given by a social networking service), entities mentioned in the article (e.g., company names, people names, event names), and/or a rating that indicates whether the article takes a positive, negative, or other view on a subject discussed in the article.

A profile of an event may include a name of the event, date and time of the event, a duration of the event, a geographic location of the event, an address of the event, a capacity of the event (e.g., no more than 250 people), identification of one or more organizers of the event, identification of one or more sponsors of the event, identification of one or more presenters or performers at the event, a number of tickets available for the event, payment information on how tickets or admission to the event may be purchased, dress attire that is expected for people attending the event, any attributes or qualifications that people need to have to attend the event (e.g., female only, must be over 55 years of age, CA residents only, emergency personnel only), and/or whether and what type of food will be available at the event.

A profile of educational or learning content may include a name of the learning content, a name of the provider of the learning content (e.g., Lynda.com), an industry targeted by the learning content, skills taught in the learning content, and people/companies/products/services referenced in the learning content.

Data contained within a profile of an entity (regardless of the entity's type) may have been specified by a representative of the entity (or by the user if the entity is a user). Additionally or alternatively, data contained within a profile may have been retrieved from sources other than the profile, such as third party sources (e.g., news sites, Wikipedia) and behavior or activity captured online. Examples of online activity includes browsing and purchase history of a user (where the entity is the user), comments by users about an event (where the entity is the event), and stock price from a stock exchange about a company (where the company is the entity). Data contained within a profile of an entity may also be derived based on data within the profile and/or data about the entity from other sources. For example, a mathematical model may been trained (using one or more machine learning techniques) based on online behavior of multiple users and can be used to classify a particular user or predict whether the particular user will perform a particular action.

Therefore, data contained within a profile of an entity may be dynamic, rather than static, in that (a) a representative or user of the entity may directly update the profile and/or (b) people or automatic processes not controlled by (or under the direction of) the representative or user of the entity may update the profile.

Contextually-Aware Content Delivery Campaign

In an embodiment, a content delivery campaign is "contextually aware"; that is, targeting criteria of a content delivery campaign indicate one or more attributes that a contextual entity must have in order for the campaign to be a candidate for a content request that includes an identifier for the contextual entity. For example, if a contextual entity is a user (i.e., that is different than the viewer), then the one or more attributes may be that the user has subscribed to premium content from a particular content provider, that the user's profile indicates that the user is skilled in the Java programming language, and/or that a current employer of the user is classified as belonging to a particular industry (e.g., the automotive industry or the tech industry). Any attribute that is contained within an entity profile may be targeted by a content delivery campaign, unless the attribute has an access restriction that prevents content providers from targeting viewers based on that attribute.

As another example, targeting criteria related to a contextual entity may include a name, such as a group name, an organization name, an entity type (e.g., organization v. user), geography of an organization, etc. As a specific example, content provider 112 may desire to target viewers who are viewing group pages where the group names include the term "C++" and, optionally, have certain attributes.

In a related embodiment, targeting criteria of a contextually-aware content delivery campaign also indicates one or more attributes that a viewer must have in order for the campaign to be a candidate campaign for a content request. Thus, both (1) viewer attributes and (2) attributes of a contextual entity are provided by a representative of a content provider (e.g., content provider 112) in establishing a contextually-aware content delivery campaign.

In an embodiment, a content delivery campaign also targets certain types of pages or types of content on a page, such as user profile pages, company profile pages, event pages, conference pages, and job-related pages (e.g., that contain job postings from multiple employers or a single employer). For example, a content delivery campaign may target viewers who have expressed an interest in horseback riding, are viewing a company profile page, and a contextual entity (i.e., the company whose profile page is being viewed) sells horse riding equipment.

In an embodiment, attributes that are associated with a contextual entity and whose existence are required to satisfy at least some targeting criteria of a content delivery campaign are not known or established until after the content delivery campaign is established or commences. Such attributes are referred to herein as "post-campaign satisfying attributes." An example of a post-campaign satisfying attribute is a job opening that a representative of an organization (e.g., a company) posts online. The online posting causes a profile of the organization to be updated to include information about the job opening or a link to the job posting. Before the job posting, information related to the job posting would not have been displayed to a viewer that satisfies any viewer targeting criteria and that is viewing a profile page of an employee of the organization. After the job posting, such information may be displayed to the viewer who is viewing a profile page of an employee of the organization (or a profile page of the organization).

As another example, a content provider establishes a content delivery campaign that targets viewers who are visiting profile pages of child companies (e.g., subsidiaries) of a particular company. No specific child company is specified or identified in the campaign. Also, at the time the content delivery campaign, there are only three child companies. Later (e.g., after the content delivery campaign commences), the particular company acquires a fourth company and a profile of the fourth company is updated to identify the particular company as a parent company. Then, when a viewer requests a profile of the fourth company, a content item associated with the content delivery campaign is displayed to the viewer.

In an embodiment, a content delivery campaign is a candidate campaign if multiple contextual entities on a web page satisfy targeting criteria of the content delivery campaign. For example, a content delivery campaign may target viewers who are viewing member pages of employees from company X, where the employees are based in country Y (e.g., Ireland).

Entities Associated with Contextual Entities

In an embodiment, a contextually-aware content delivery campaign specifies one or more attributes, not of a contextual entity, but of an entity that is associated with the contextual entity. Such an entity is referred to herein as a "non-visible contextual entity." For example, if a contextual entity is a user, then the one or more attributes (specified by the campaign) may be job openings at a particular organization (e.g., a company) at which the contextual entity user is currently employed. In this example, a further contextual attribute or requirement is that the viewer has skills (or other characteristics) that qualify the viewer for one or more of the job openings. If so, then a content item associated with the content delivery campaign is transmitted to a computing device of the viewer. The content item may be tailored to the viewer, such as by identifying specific job openings that are applicable to the viewer.

Example Content Delivery Exchange Process

Figure 2:
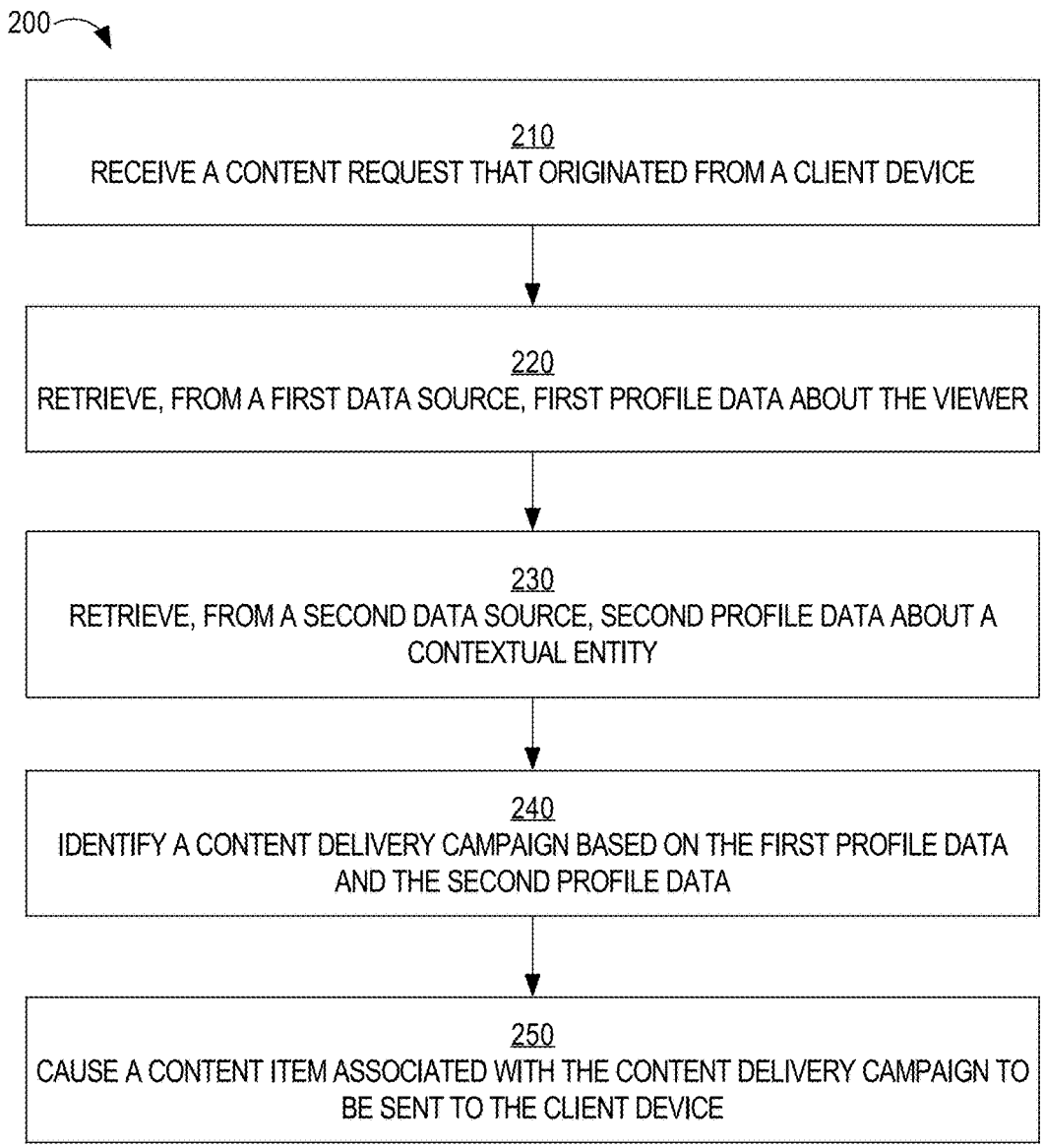
FIG. 2 is a flow diagram depicting a process for providing a content item that is based on the context of what a user is viewing, in an embodiment.
Figure 3:
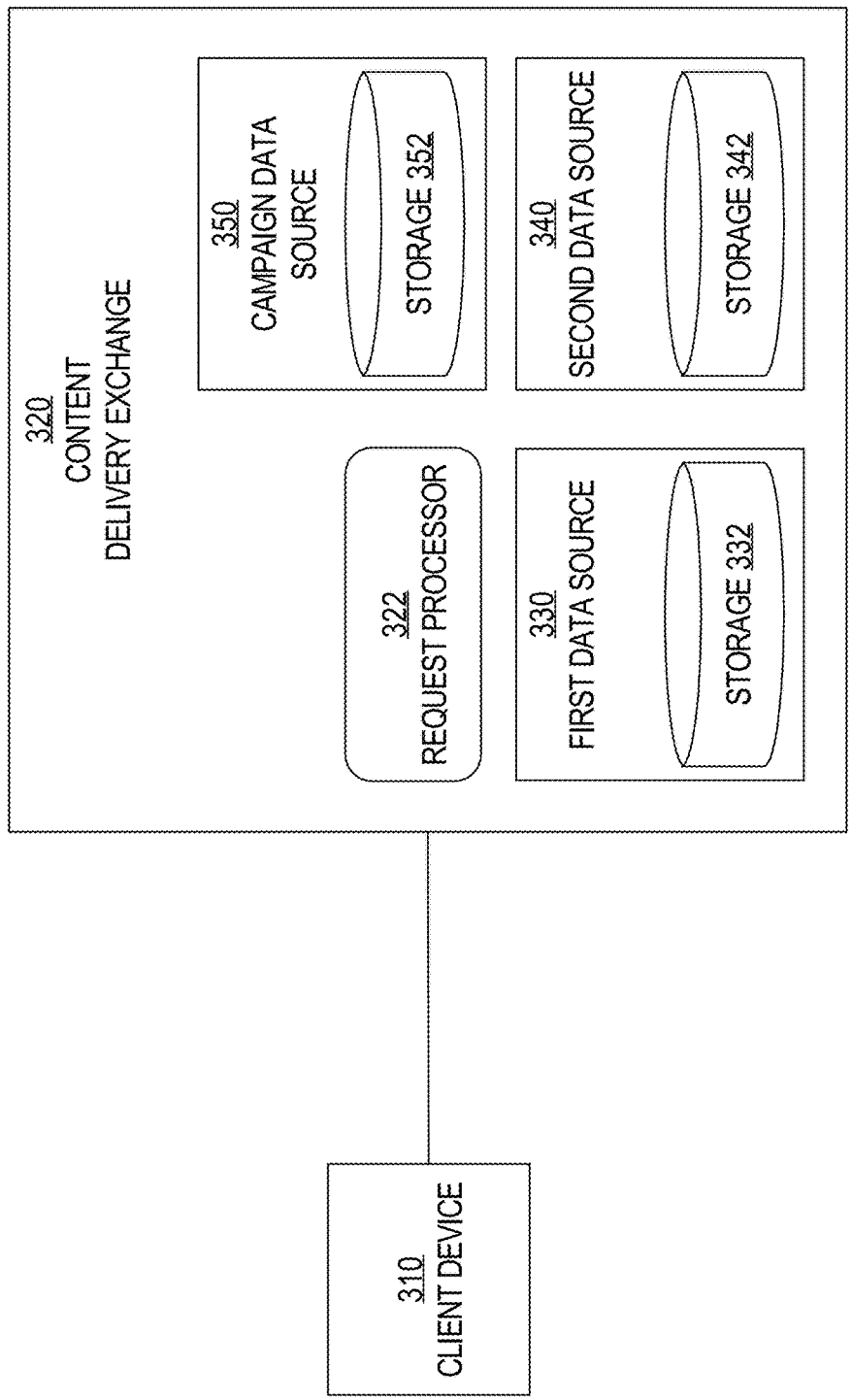
FIG. 3 is a block diagram that depicts elements of an example content delivery exchange, in an embodiment.

FIG. 2 is a flow diagram depicting a process 200 for providing a content item that is based on the context of what a user is viewing, in an embodiment. Process 200 may be performed by one or more components of content delivery exchange 120. Process 200 is described in the context of FIG. 3, which depicts elements of an example content delivery exchange, in an embodiment.

At block 210, a request processor in a content delivery exchange 320 receives a content request that originates from a client device 310, operated by a viewer. The content request includes a viewer identifier and at least one contextual entity identifier. The content request may include data that indicates whether there is a contextual entity identifier and/or which identifier is a viewer identifier and which identifier is a contextual identifier. Such data may be the ordering of the identifiers. For example, if there are multiple identifiers in a content request, then the first identifier in the content request is the viewer identifier and the remaining identifier(s) is/are contextual entity identifier(s).

Additionally, the viewer identifier and, optionally, the contextual entity identifier are encrypted at the computing device and remain encrypted until decrypted at context exchange 320 or a downstream service that context exchange 320 relies on to retrieve profile data associated with the identifier(s).

At block 220, first profile data about the viewer is retrieved from a first data source 330. First data source 330 may include a server that receives and processes requests from request processor 322 and retrieves data from storage 332. Storage 332 may be any storage media, whether volatile or non-volatile, hard disk drive (HDD) or solid state drive (SSD).

Block 220 may involve one component (in content delivery exchange 320) initiating a first (e.g., API) call to a first service (hosted by first data source 330), where the first call includes the viewer identifier as a parameter value of the first call.

At block 230, second profile data about the contextual entity is retrieved from a second data source 340. Second data source 340 may include a server that receives and processes requests from request processor 322 and retrieves data from storage 342. Block 230 may involve one component (e.g., the same as in block 220) initiating a second (e.g., API) call to a second service (hosted by second data source 340), where the second call includes the contextual entity identifier as a parameter value of the second call.

While first data source 330 and second data source 340 are depicted as being implemented within content delivery exchange 320, such data sources may be implemented separately from content delivery exchange 320, such as within the same network as content delivery exchange 320 or outside of the exchange's network.

If the contextual entity is a user, then the second service may be the same as the first service. If the contextual entity is another type of entity (e.g., a group or a company), then the second service may be different than the first service.

The type of contextual entity may be determined based on the format or size of the contextual entity identifier. For example, contextual user identifiers may begin with one prefix (e.g., "U-"), contextual group identifiers may begin with another prefix (e.g., "G-", contextual company identifiers may begin with another prefix (e.g., "C-"), and contextual university identifiers may begin with yet another prefix (e.g., "U-"). Once the type of entity is determined, one of multiple services may be called for profile data associated with the identifier of the contextual entity.

At block 240, a content delivery campaign is identified based on the first profile data (i.e., of the viewer) and the second profile data (i.e., of the contextual entity). The targeting criteria of a content delivery campaign must be satisfied (in part or in full) in order for the content delivery campaign to be identified.

Block 240 may involve request processor 322 passing information from the first profile data and the second profile data to campaign data source 350, which may include one or more servers that perform the task of determining which content delivery campaigns (stored in storage 352) are relevant based on the two different profile data.

Block 240 may involve identifying multiple content delivery campaigns that may be used to provide one or more content items in response to the content request received in block 210 (i.e., because the targeting criteria of those campaigns are, at least partially, satisfied). In that case one campaign or a subset of the identified campaigns are selected based on one or more additional criteria, such as expected revenue or predicted user interaction with respect to a content item associated with the content delivery campaign.

The content delivery campaign may have been established by a third-party content provider or by an authorized representative of content delivery exchange 320.

At block 250, after the content delivery campaign is identified, a content item associated with the content delivery campaign is sent to client device 310, which initiated the content request.

In an embodiment, instead of a unique contextual entity identifier (e.g., a sequence of ten alphanumeric characters), a content request may include a name of one or more contextual entities, such as a name of a company (e.g., "Google"), a name of a user (e.g., "George Williamson"), a name of an event (e.g., "3$^{rd}$ Annual Drone Tech Conference"), or a title of an article (e.g., "Stunning Effects of New Diabetes Drug"). Such a name or title may be extracted by code (executing in a web browser or a dedicated client-side application) analyzing contents of a web page or view.

Multiple Content Requests

In an embodiment, a single page view (e.g., web page) requested by a client device from publisher 130 may trigger multiple content requests to content delivery exchange 120. Thus, multiple content items associated with contextual entities and/or non-visible contextual entities may be displayed concurrently on a display of the client device. One of the content requests may include an identifier of a contextual entity of one type (e.g., user/member) and another of the content requests may include an identifier of a contextual entity of another type (e.g., group). However, each content request may include the same viewer identifier.

For example, a single page view displayed by a smartphone application may include a news feed of multiple articles that are displayed concurrently. Each article is a separate contextual entity and is associated with a different contextual entity identifier. When a client device loads the page, multiple content requests are generated (by processing (e.g., JavaScript) code within the page) and sent to content delivery exchange 120. A content request may be generated and sent only upon a determination that the associated contextual entity is in view or is about to be in view (e.g., as the viewer scrolls down the page view). In this way, many simultaneous content requests to content delivery exchange 120 may be avoided.

As another example, a tech conference page contains information about multiple tech conferences that have occurred and/or are planned for the future. Each tech conference is a different contextual entity. Loading the tech conference page (e.g., in a web browser) causes multiple content requests to be transmitted to content delivery exchange 120, each content request including a contextual entity identifier of a different tech conference. A different content item may be displayed on the tech conference page for each content request. Alternatively, some content requests may not result in identifying any content item because no content delivery campaign is determined to be relevant (e.g., because no targeting criteria of any content delivery campaign is satisfied).

In an embodiment, content items displayed concurrently in response to multiple content requests are displayed separately. Each content item is displayed adjacent to the associated contextual entity. For example, if contextual entities are spread throughout a web page or web view, then the content items may similarly be spread throughout the web page. Alternatively, multiple content items are displayed concurrently in a single aggregated block. For example, the content items are displayed on the right side (or right "rail") of a web page, where the content items are aggregated and appear as a single unit or object.

Example Context: Feeds

As noted previously, content items that are displayed based on information about contextual entities may be displayed in many different contexts of user interaction with a content provider, which may be different than content providers 112-116. Example user interaction contexts include a feed context, a messaging context, a user activity context, a notifications context, and an entity profile context.

Figure 4A:
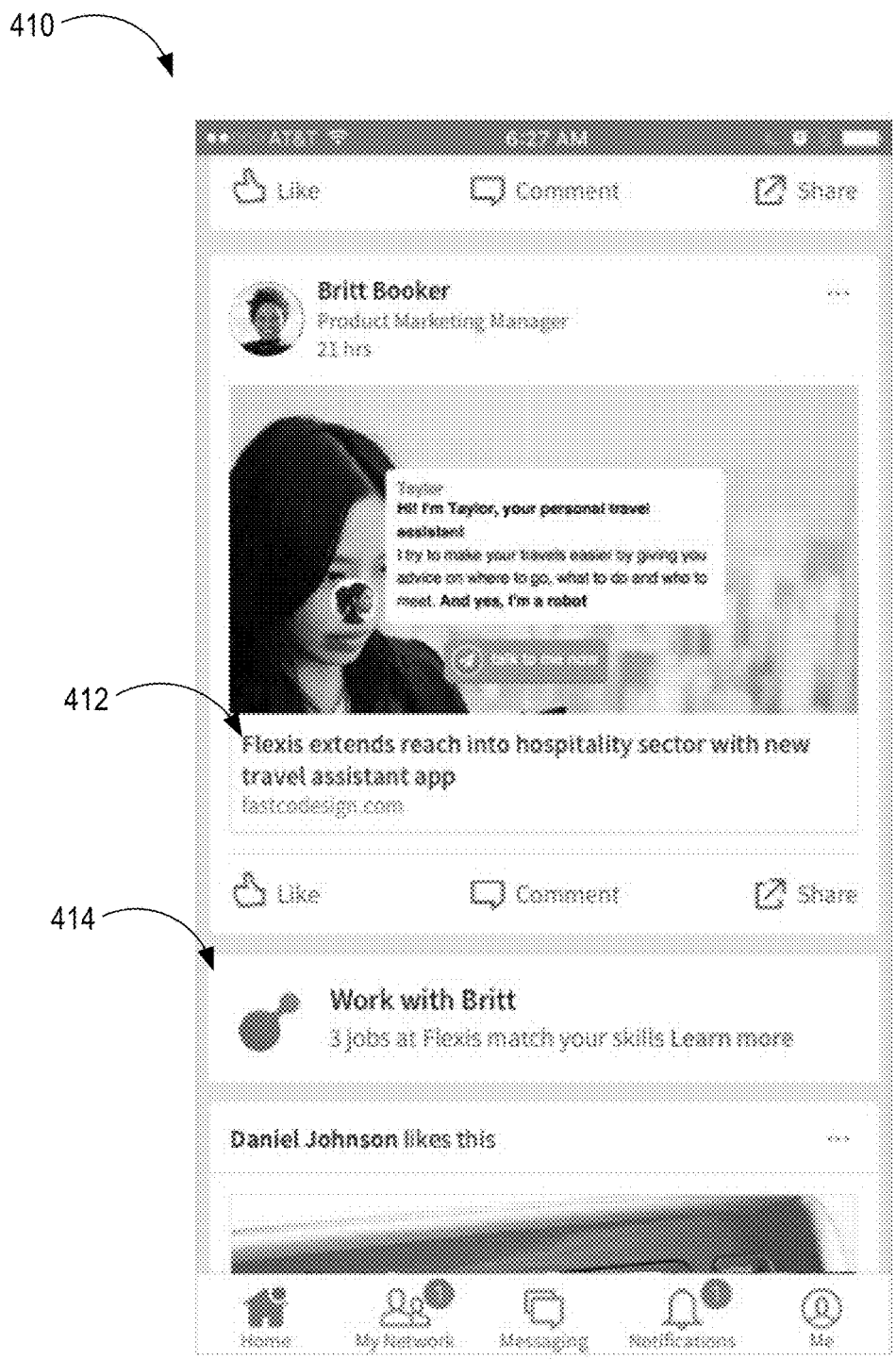
FIGS. 4A-4B are example screenshots that each depict, within a feed context, a content item that is based on a contextual entity, in an embodiment.

FIG. 4A is an example screenshot 410 that depicts a result of embodiments described herein. Screenshot 410 depicts a portion of a feed for a viewer. The feed includes information about data items that may be relevant to the viewer. A data item may comprise a link, a text description, one or more graphics, video, and/or audio. Example data items include links to: (1) articles that "friends" or connections of the viewer have posted to a content delivery service (e.g., a social network service); (2) articles that "friends" or connections of the user have commented on; (3) articles involving companies that the viewer has explicitly "followed" and/or implicitly followed by viewing their respective company profile pages, purchasing or "liking" a product or service from the respective companies, applied for a job opening at the respective companies, and/or some other connection, relationship, or association with the company; (4) posts/discussions in a group to which the viewer has subscribed; (5) job postings that might be relevant to the viewer; (6) notifications or reminders for certain events (e.g., "celebrate 5 years at your current job"); (7) prompts to a viewer to engage other users/member (e.g., congratulate a friend connection on a new job/promotion, time at company, send a message to contact a connection who the viewer has not engaged with recently); and (8) articles for courses or seminars that might be relevant to the viewer.

In screenshot 410, a (contextual) user (Britt Booker) posted an article that is referenced by content item 412. The user may be a friend or connection to the viewer in a social network. In this example, a contextual entity identifier may be an identifier for the contextual user. Content delivery exchange 320 receives the contextual entity identifier (e.g., from a client device of the viewer) and sends the contextual entity identifier to either first data source 330 or second data source 340, one of which returns a profile for the contextual user Britt. Content delivery exchange 320 determines, based on the profile, that Brit is employed at a company named Flexis, that a job opening exists at Flexis, and that the viewer has a certain set of skills that matches the skills required by the job opening. Content delivery exchange 320 may determine that a job opening exists at Flexis by using a name or identifier of the company located in Britt's profile to look up a company profile based on the name or identifier. Such a look up may involve a call to a service, such as a service provided by second data source 340. The company profile may contain current information about one or more job openings, such as job title, job skill(s) required, job responsibilities, compensation information, location of the job, etc. Alternatively, instead of looking up the company profile in a company profile database, content delivery exchange 320 may identify the one or more job openings found in a job database that contains job openings from many different companies, organizations, government agencies, etc.

Prior to receiving the contextual entity identifier, a content delivery campaign may have been established with content delivery exchange 320. The content delivery campaign may have been established by Flexis or by another party acting on behalf of Flexis. Alternatively, a party that owns, manages, or runs content delivery exchange 320, such as a social networking service, stores job matching criteria that is applicable to multiple viewers and different (visible or non-visible) contextual organizations and that may be used across industries and types of jobs. Thus, a company does not need to establish a campaign with content delivery exchange 320 in order for job openings of the company to be displayed to viewers along with contextual entities.

If a content delivery campaign is established, the campaign may include (1) one or more viewer attributes that indicate the set of skills and (2) a contextual entity attribute that a matching viewer is a "friend" of (or is connected to) a contextual user that is employed by Flexis. Because these conditions are satisfied in this example, content item 414 is displayed. Content item 414 includes a logo of Flexis, indicates a number of jobs at Flexis that match some of the skills of the viewer, and includes an invitation to learn more about the job opportunities using text and providing a link. The link may be to an online resource that is within the same domain that provides the feed, such as a social networking domain. Alternatively, the link may be to an online resource that is outside that domain, such as a page provided by Flexis. By selecting the link (or any portion of content item 414), the viewer may be displayed a page view depicting information about the three job openings at Flexis.

Figure 4B:
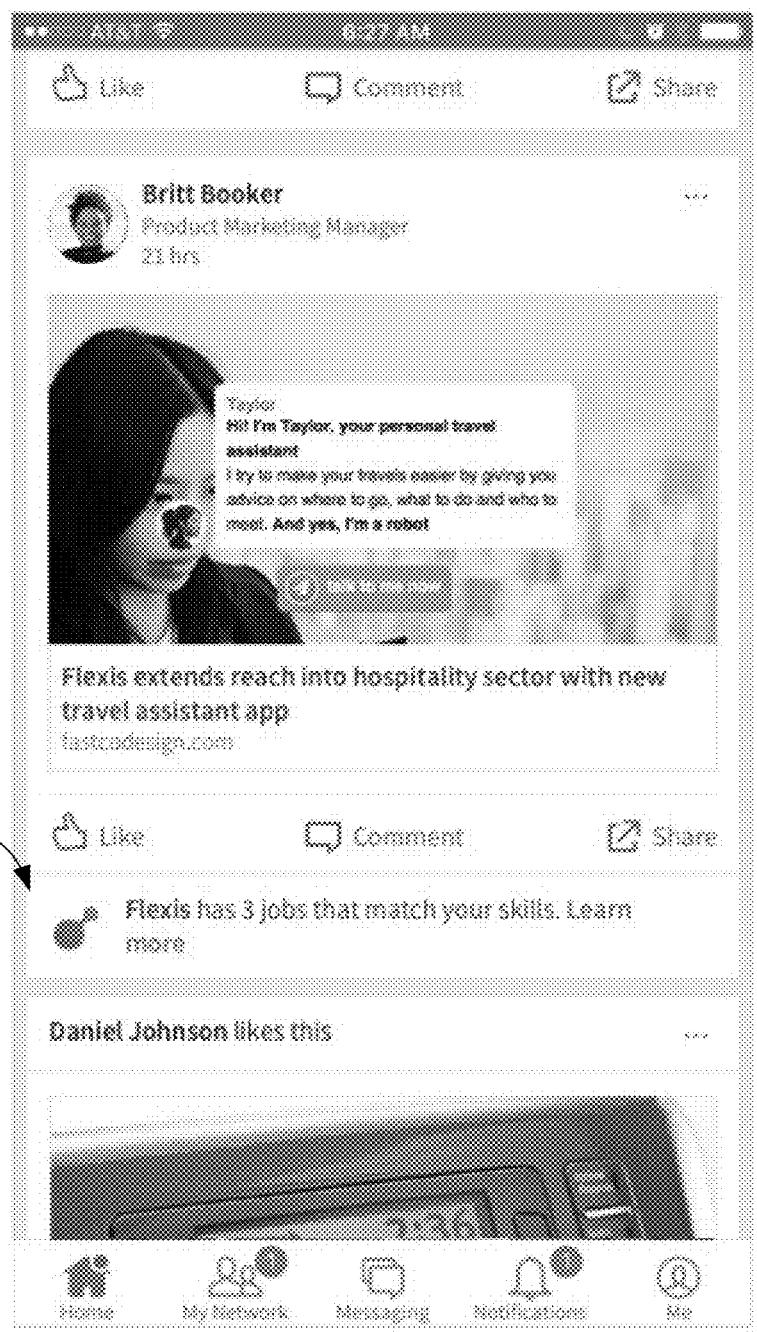

FIG. 4B is an example screenshot 420 that is very similar to screenshot 410. One difference is content item 424, which has slightly different text than content item 414 in screenshot 410. In example screenshot 420, the contextual entity identifier may have been a contextual article identifier that (uniquely) identifies the article (relative to other articles maintained by, or accessible to, content delivery exchange 320) that is posted by user Britt Booker. Content delivery exchange 320 receives the contextual article identifier (e.g., from a client device of the viewer) and passes the identifier to a service (e.g., provided by second data source 340 or another data source not depicted) that returns an article profile based on the identifier.

In this example, content delivery exchange 320 determines, based on the article profile, that Flexis is mentioned in the article. In response, content delivery exchange 320 passes the company name to a service (e.g., provided by second data source 340) to retrieve a profile of the company. Content delivery exchange 320 receives the company profile, analyzes the company profile to identify one or more job openings, determines that one or more of the viewer's skills match skills required for three job openings at the company, and sends content item 424 to a client device of the viewer.

Example Context: Messaging

Figure 5A:
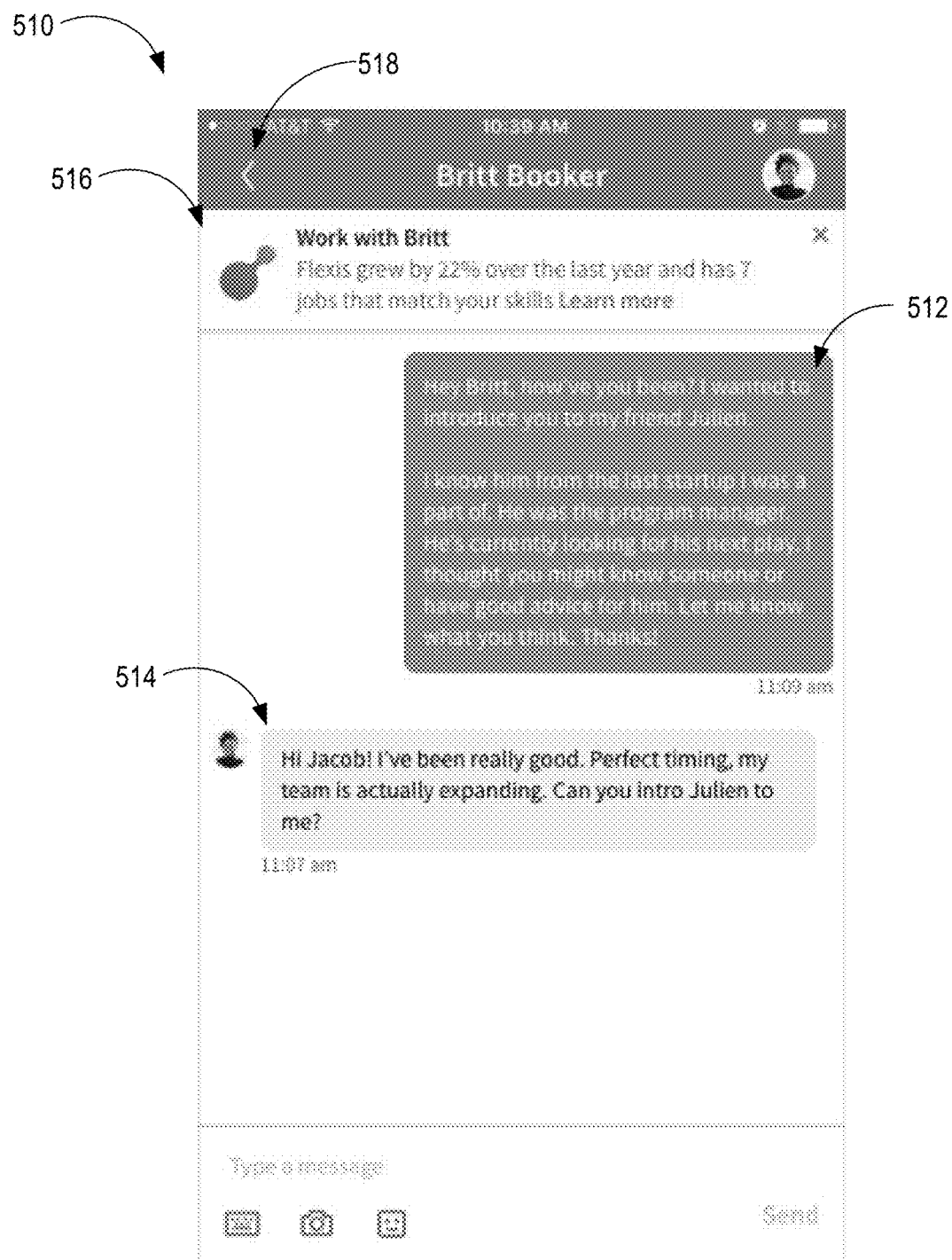
FIGS. 5A-5B are example screenshots that each depict, within a messaging context, a content item that is based on a contextual entity, in an embodiment.

FIG. 5A is an example screenshot 510 that depicts a result of embodiments described herein. Screenshot 510 depicts a view of a messaging history with another user (Britt Booker in this example), such as a friend or connection in a social network. The view of the messaging history includes two messages: 512 initiated by the viewer (Jacob in this example) and 514 initiated by the other user (Britt). Similar to the description above, a contextual entity identifier for Britt is sent to content delivery exchange 320, which retrieves a user profile based on the identifier, identifies a current employer (Flexis) listed in the user profile, retrieves a company profile based on an identity of the current employer, identifies multiple job openings in the company profile (or a separate job opening database), and determines that 7 job openings at Flexis match skills of the viewer.

In an embodiment, additional information about a contextual entity (whether visible or non-visible) may be determined and displayed with a content item that corresponds to a content delivery campaign. Such information may have been generated and stored in association with a profile of the contextual entity after the content delivery campaign was established or commences. Content item 516 includes an example of such additional information. The growth information related to the contextual company may be stored (and, optionally, defined) in a company profile as a positive metric that can be displayed to viewers, especially viewers who might be searching for a job or might be searching for a company in which to invest.

Thus, in this example, content delivery exchange 320, in addition to determining that 7 job openings match skills of the viewer, determines (e.g., based on the company profile or another source, such as a financial source) that Flexis grew by 22%. In addition to containing information about the job openings and the company growth, content item 516 also contains a link to an online resource that provides more information about the 7 job openings.

If back arrow 518 is selected, then a view of a list of users may be displayed, among which Britt Booker may be listed. If any user in the list works at an organization that has a job opening that matches the skills of the viewer (Jacob in this example), then information about the job opening and/or organization may be displayed adjacent to the user's name. Thus, multiple content items like content 530 may be displayed concurrently in the view of the list of users.

Figure 5B:
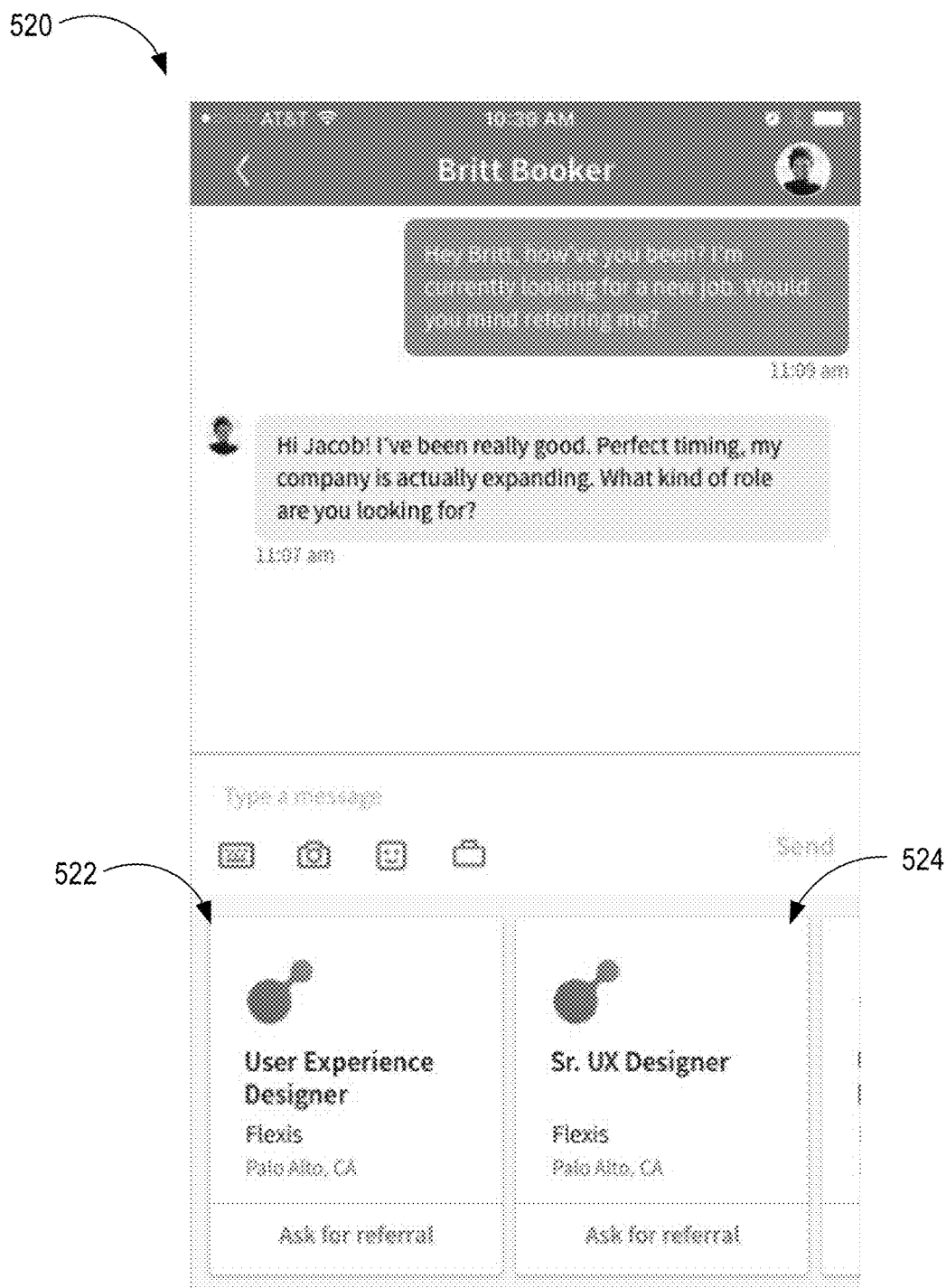

FIG. 5B is an example screenshot 520 that is similar to screenshot 510. However, instead of a single contextual content item displayed above the messaging history in the page view, screenshot 520 depicts two contextual content items 522 and 524 below the messaging history in the page view. Content items 522 and 524 correspond to different job openings with different job titles. Each of content items 522 and 524 indicates the same employer, a location of the corresponding job opening, and a job title of the job opening. Thus, content items 522 and 524 provide different information than content item 516 in screenshot 510. Also, each of content items 522 and 524 includes a link that, when selected, sends a message to one of the contextual entities (Britt, in this example), where the message requests the contextual user to refer the viewer to the employer or a hiring representative thereof.

Example Context: Activities

In an embodiment, contextual users are identified and presented to a viewer based on actions that the contextual users have performed. Example actions include offline actions (e.g., signing a form to receive more information about a company, a social cause, a product, or a service) and online actions, such as viewing another user's profile, purchasing a particular product or service online, and selecting certain web links.

Figure 6A:
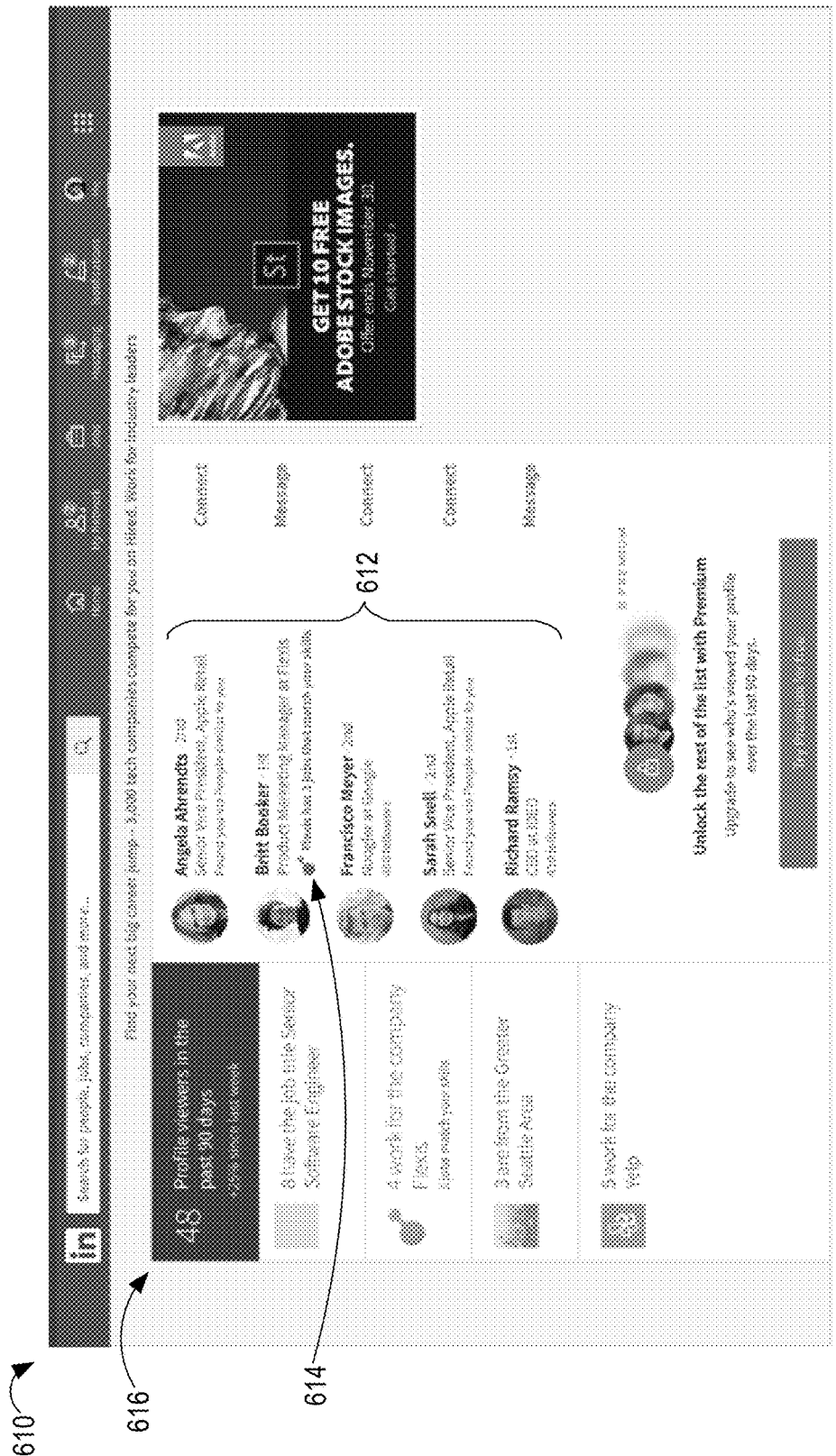
FIGS. 6A-6C are example screenshots that each depict, within a non-viewer user activity context, a content item that is based on a contextual user, in an embodiment.

FIG. 6A is an example screenshot 610 displayed on a computing device with a relatively large screen, such as a desktop computer, a laptop computer, and some tablet computers. Screenshot 610 is of a "Who's Viewed My Profile" (WVMP) page, in an embodiment. Screenshot 610 includes a list of users 612 who have viewed a viewer's profile. In this example, some of the users in list 612 are already connected to the viewer in a social network and other of the users in list 612 are not currently connected to the viewer in the social network.

List 612 includes content item 614 that is displayed adjacent to the second user listed in list 612. Content item 614 may have been determined in a manner similar to content item 414 in screenshot 410.

Screenshot 610 also includes content item 616 that indicates a number of users who have viewed the viewer's profile in the last 90 days (48) and who are employed at Flexis (4). Content item 616 also indicates a number of job openings at Flexis that match skills of the viewer (3).

Figure 6B:
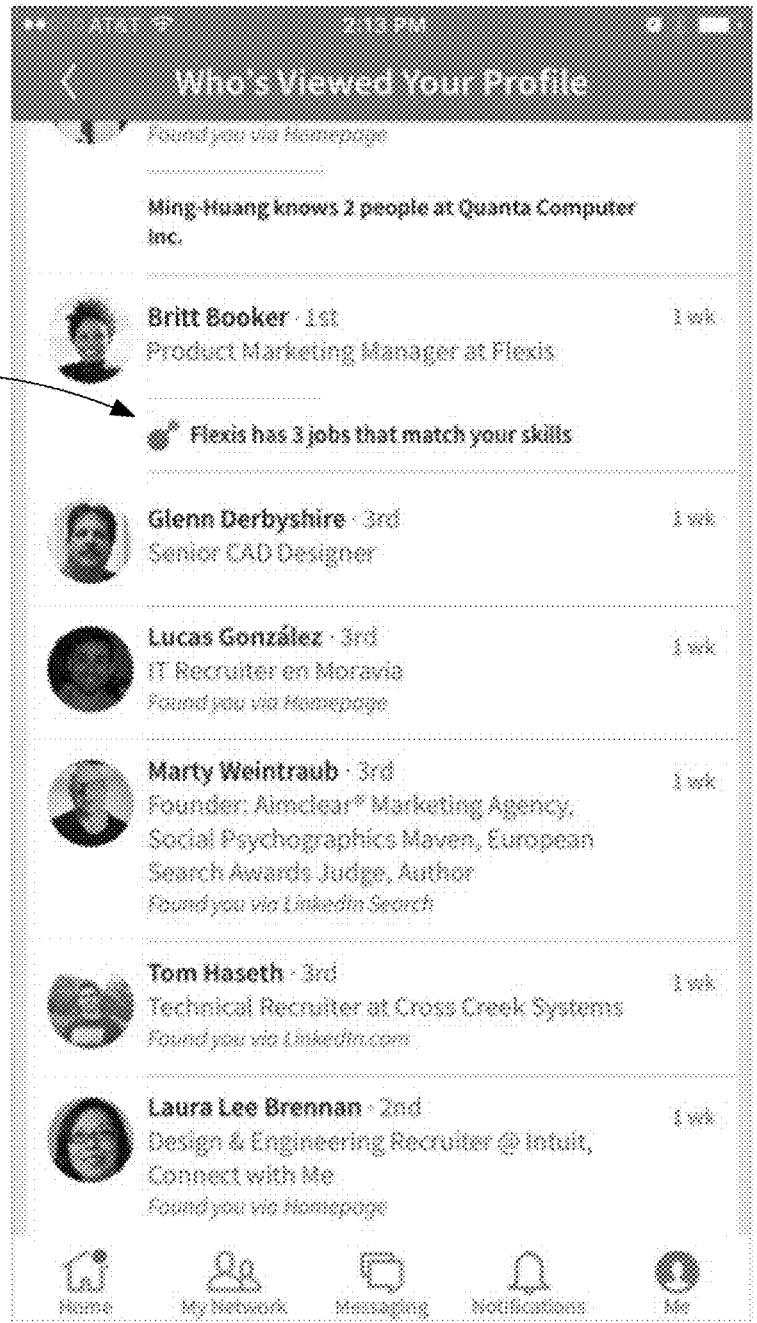

FIG. 6B is an example screenshot 620 displayed on a mobile device that has a relatively small screen size, such as a smartphone. Similar to screenshot 610, screenshot 620 lists users who have viewed the viewer's profile in the recent past, such as the most recent viewers of the profile. Screenshot 620 includes content item 622 that is displayed adjacent to a user (in the list) who is employed at Flexis. Content item 622 may have been determined in a manner similar to content item 414 in screenshot 410.

Figure 6C:
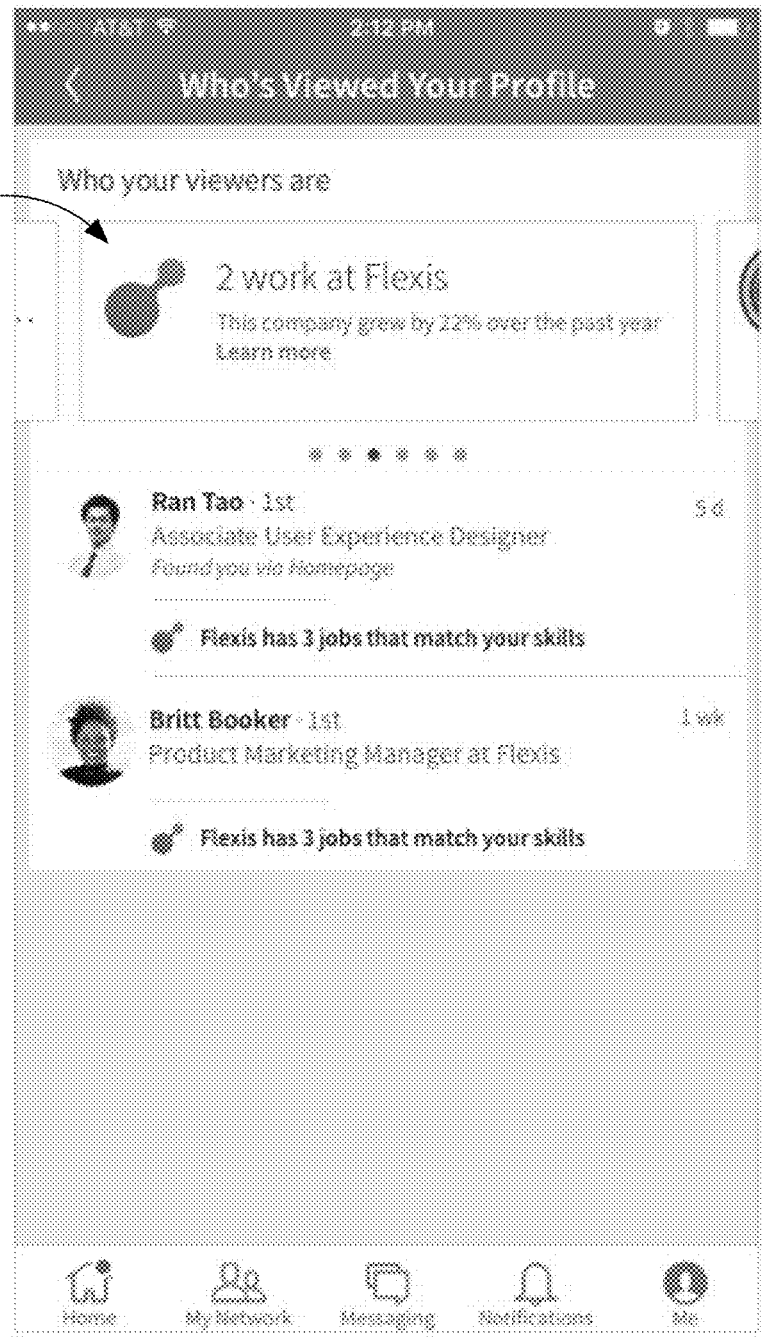

FIG. 6C is an example screenshot 630 displayed on a mobile device that has a relatively small screen size, such as a smartphone. Similar to screenshot 620, screenshot 630 lists users who have viewed the viewer's profile in the recent past and who work at a particular employer (i.e., Flexis in this example). Screenshot 630 includes content item 632 that is displayed adjacent to users in the user who are employed at Flexis. Content item 632 may have been determined in a manner similar to content item 414 in screenshot 410.

In the example of FIG. 6C, users who have performed a particular action (i.e., viewed the viewer's profile in this example) are further organized based on other common traits or characteristics. For example, if content item 632 is swiped left or right based on input from the viewer, then a different set of one or more users who have performed the particular action may be displayed. For example, content item 632 may be replaced with a content item regarding (a) another employer, (b) an academic institution that one or more users have attended and that is identified based on a determination that the viewer is a candidate for attending the academic institution (e.g., the viewer is a student or has not yet received a graduate degree), (c) a skills provider that is in the business of training people to have certain skills and that is identified based on one or more users in the list who have those certain skills. For example, the content item may be about a university at which three users (who have viewed the viewer's profile) attended and it is determined that the viewer has an undergraduate degree that qualifies the viewer to be in a master's degree program provided by the university.

Example Context: Notification

Figure 7A:
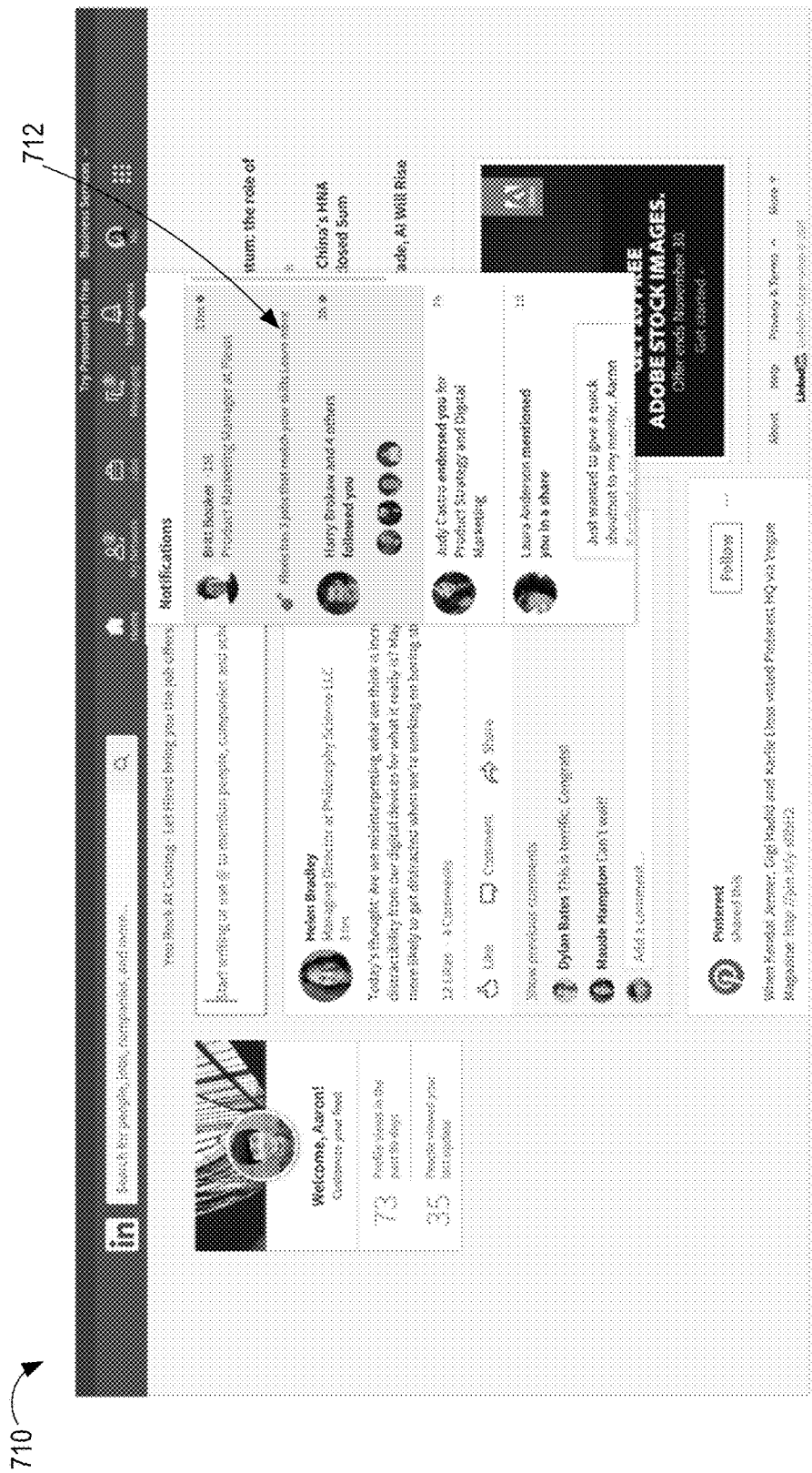
FIGS. 7A-7B are example screenshots that each depict, within a notification context, a content item that is based on a contextual entity, in an embodiment.
Figure 7B:
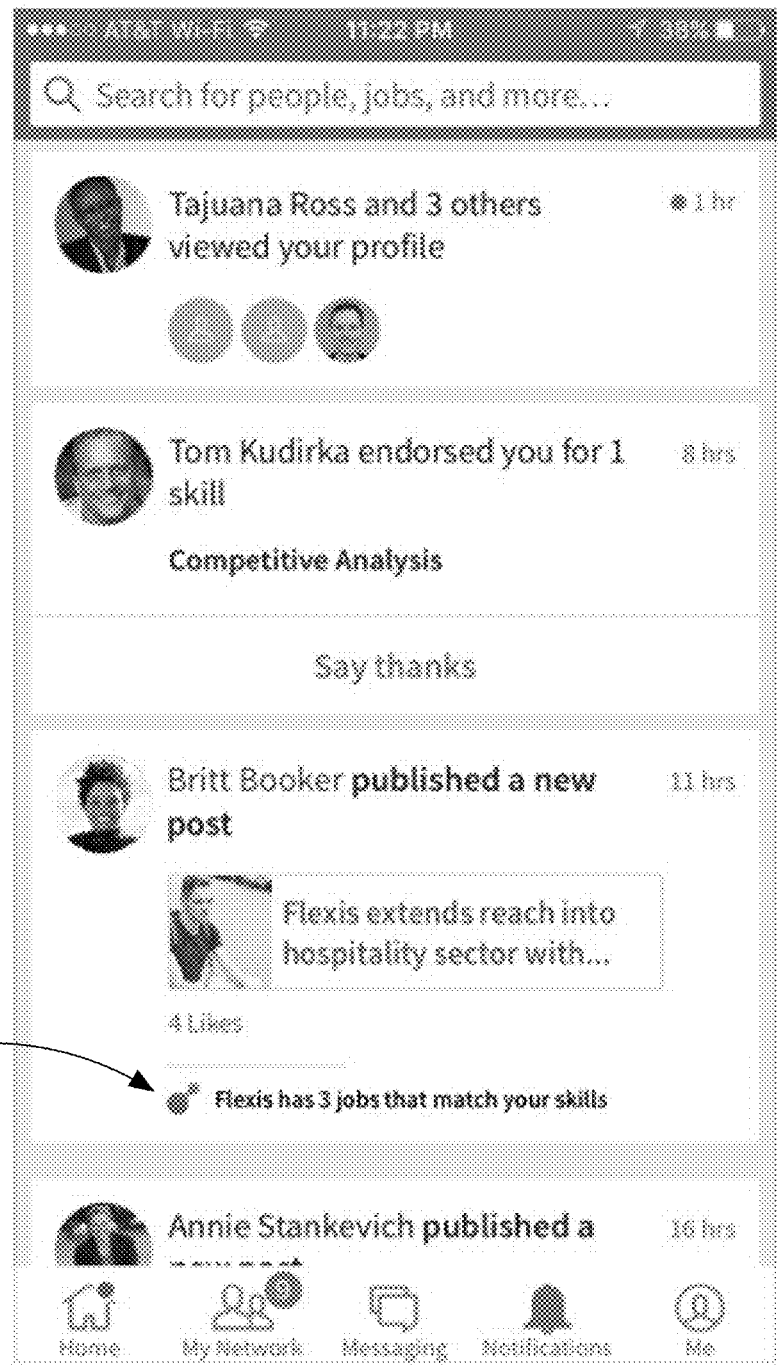

FIGS. 7A-7B are example screenshots 710-720 that include identities of users who are friends of (or connected to) the viewer (named Aaron in this example) in a social network. The viewer is notified of these users based on activities that the users have performed. Example activities include publishing an article or post, endorsing the viewer, "following" the viewer (or subscribing to receive updates about the viewer and/or receive notifications about content that the viewer has uploaded to a content sharing platform), and mentioning the viewer in a comment, article, or other type of publishable data item.

Screenshot 710 is displayed on a computing device with a relatively large screen, similar to screenshot 610. Screenshot 720 is displayed on a computing device with a relatively small screen, similar to screenshot 620.

As in the other example screenshots, screenshots 710 and 720 include content items regarding employment opportunities based on profiles of contextual users whose identities are displayed based on their respective activities. In these examples, screenshot 710 includes content item 712 immediately below a notification regarding a contextual user (i.e., Britt Booker) and screenshot 720 includes content item 722 immediately below a notification regarding a contextual user (i.e., Britt Booker) who published a new post.

Example Context: Profile Page

Figure 8A:
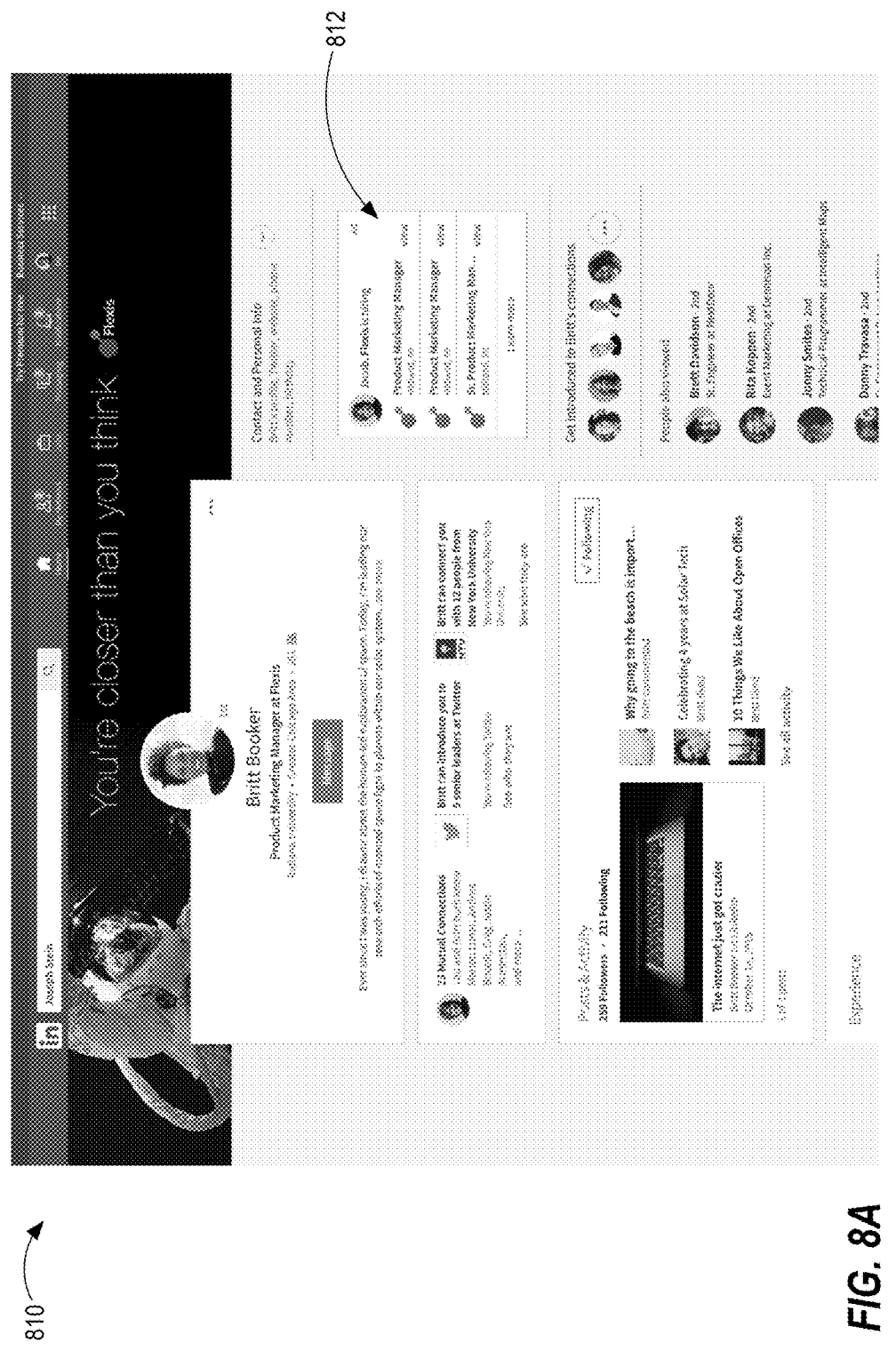
Figure 8B:

FIGS. 8A-8B are, respectively, example screenshots 810-820 of profile pages of a (contextual) user that is different than the viewer. As in other examples described herein, the contextual user is Britt Booker. The viewer (that requested the profile page of the contextual user) is named Jacob.

Screenshot 810 is displayed on a computing device with a relatively large screen, similar to screenshot 710. Screenshot 820 is displayed on a computing device with a relatively small screen, similar to screenshot 720.

The profile page of Britt Booker includes information about Britt, such as job title, employer, academic institution attended, current residence, number of friends or connections, a number of mutual connections of Britt and Jacob (and identities of some of those mutual connections), information about people (at a company that the viewer is following) that Britt can introduce to the viewer, information about people (at a university that the viewer is following) to whom Britt can connect the viewer, a number of followers of Britt, a number of people or other entities that Britt follows, a way to get introduced to connections of Britt, a list of users who were viewed by viewers of Britt's profile page, and experience, such as work history.

The profile page also includes content item 812, which includes information about Britt's employer and three specific job opportunities at Britt's employer. The job opportunities may be provided to the viewer based on information in the viewer's profile, such as skills that match skills required by the three job opportunities. Thus, for a different viewer, a content delivery campaign whose targeting criteria are satisfied may be different than the content delivery campaign associated with content item 812. For example, a content delivery campaign involving one or more finance-related job openings at Britt's employer may be identified when a different viewer with different skills (such as finance-related skills) views Britt's profile page. Additionally or alternatively, the visible or non-visible contextual entity may be entirely different, such as a university that Britt attended instead of Britt's current employer.

Due to the relatively small size of the viewer's screen, content item 822 in screenshot 820 contains less information about the job openings relative to content item 812.

Dynamic Pages

Some web pages (e.g., displayed through a browser) or web views (e.g., displayed though a "smartphone" application) contain content that changes automatically (i.e., not in response to user input) or in response to user input, such as selecting a button or checkbox or scrolling through a news feed or set of images. Some pages on a website may be more dynamic than others. For example, a user provides input that causes a new set of article items to be displayed, each article item identifying an article and providing one or more items of information about the article. As another example, a subset of a set of user items is displayed in response to a search for users that satisfy certain criteria, each user item identifying a user and providing one or more items of information about the user. Then, a user selects a filter criterion that filters the set of user items and a different subset is displayed. Other examples include a user selecting a "like" button adjacent to an article, commenting on a blog posting, and entering text into a search field.

In an embodiment, one or more particular content items are identified for display on a web page in response to changes to the web page. The changes do not involve a reloading of the web page. The web page may already contain a set of previously-identified content items (e.g., ads). All or a subset of the set of previously-identified content items may remain on the web page when the one or more particular content items are displayed. For example, when a display of article items is scrolled through (whether automatically, or in response to user input), an article identifier associated with each newly-displayed article item is transmitted to content delivery exchange 120 along with a viewer identifier in order to determine whether profile data of the viewer and profile data of the article satisfy the targeting criteria of any content delivery campaign.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
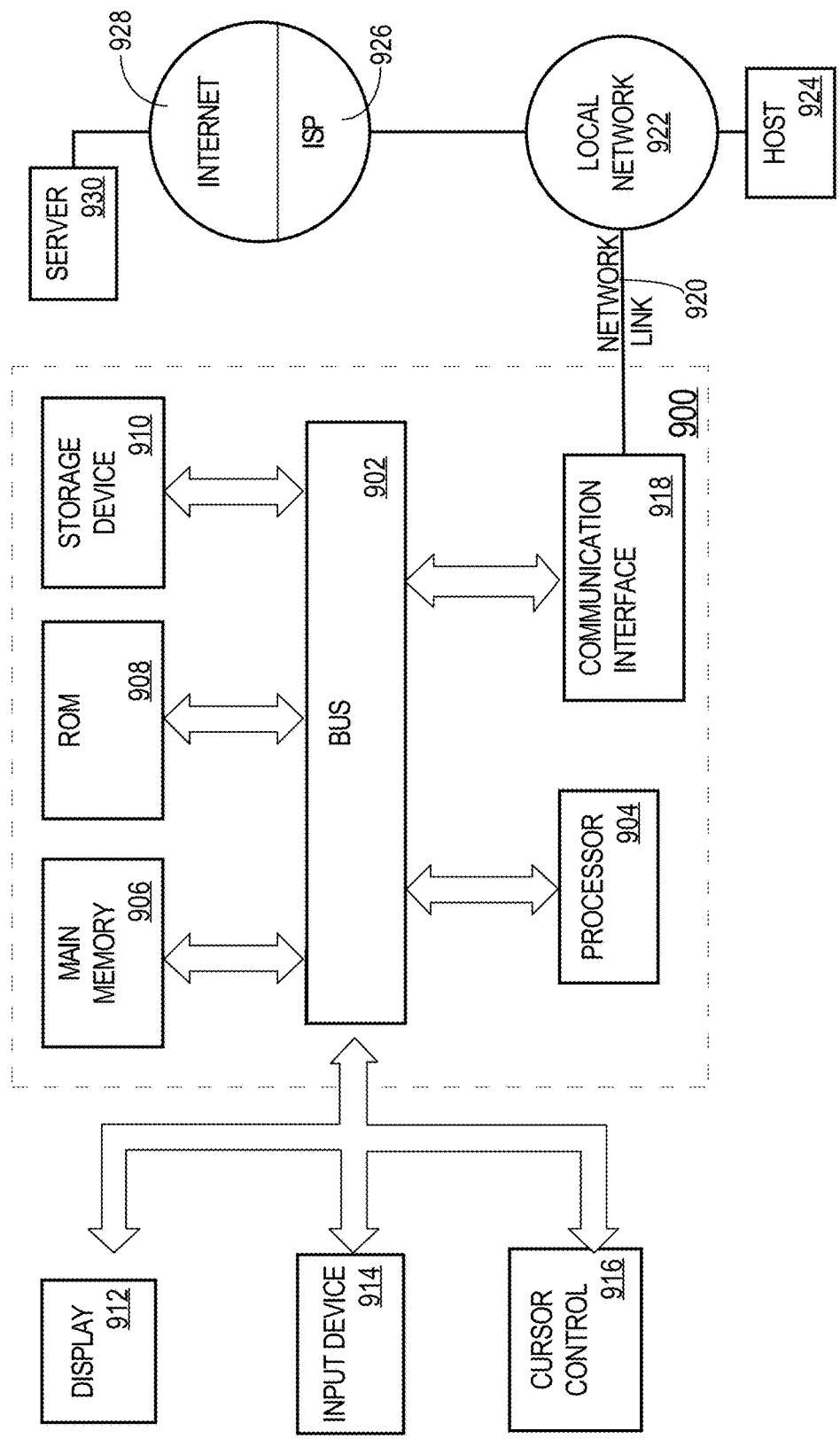
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more processors;
   one or more storage media storing instructions which, when executed by the one or more processors, cause:
   receiving, from a content provider, campaign data that includes targeting criteria, one or more contextual criteria, and particular content;
   initiating a content delivery campaign for the content provider based on the campaign data;
   based on the targeting criteria and first profile data of a user, associating the user with the content delivery campaign;
   after initiating the content delivery campaign, receiving, over a network, a content request that includes (1) a viewer identifier of the user that requested web content hosted by another system and (2) a contextual entity identifier of an entity that is referenced in the web content;
   in response to receiving the content request:
   identifying, based on the viewer identifier, the one or more contextual criteria, and the contextual entity identifier, the content delivery campaign from among a plurality of content delivery campaigns;
   determining the particular content to deliver based on the content delivery campaign;
   sending the particular content to a computing device that initiated the content request.

2. The system of claim 1, wherein:
   the entity is a first entity;
   the content delivery campaign is a first content delivery campaign;
   the contextual entity identifier is a first contextual entity identifier;
   the content request includes a second contextual entity identifier that is different than the first contextual entity identifier;
   the instructions, when executed by the one or more processors, further cause, in response to receiving the content request:
   retrieving, based on the second contextual entity identifier, third profile data about a second entity that is associated with the second contextual entity identifier and that is different than the first entity;
   identifying, based on the viewer identifier and the third profile data, a second content delivery campaign;
   determining second content to display based on the second content delivery campaign;
   sending the second content to the computing device that initiated the content request.

3. The system of claim 2, wherein the second content delivery campaign is different than the first content delivery campaign.

4. The system of claim 1, the instructions, when executed by the one or more processors, further cause:
   retrieving, based on the contextual entity identifier, second profile data about the entity.

5. The system of claim 2, wherein:
the first entity is a first type of entity and the second entity is a second type of entity that is different than the first type;
the first type of entity is one of an academic institution, a company, an organization, a group, a slide, an article, a post, a conference, or an event.

6. The system of claim 4, wherein:
the entity is a second user that is different than the user;
the second profile data includes data about one or more of work history of the second user, employer of the second user, academic history of the second user, connections of the second user, articles published by the second user, endorsements of the second user, or skills of the second user.

7. The system of claim 4, wherein:
the entity is an organization that is not identified in the first profile data;
the second profile data includes data about one or more of a name of the organization, a geographic location of the organization, job openings of the organization, employment numbers of the organization, growth information of the organization, financial information of the organization, or one or more awards received by the organization.

8. The system of claim 4, wherein:
the entity is an academic institution;
the second profile data includes data about one or more of a name of the academic institution, a size of the academic institution, a geographic location of the academic institution, enrollment statistics of the academic institution, sports sponsored by the academic institution, academic degrees offered by the academic institution, one or more national rankings of the academic institution, awards received by the academic institution, or cost of attending the academic institution.

9. The system of claim 4, wherein:
the entity is a group that does not include the user;
the second profile data includes data about one or more of a size of the group, a geographic location of the group, a name of the group, a mission of the group, one or more awards received by the group, one or more upcoming events associated with the group.

10. The system of claim 4, wherein:
the entity is an event;
the second profile data includes data about one or more of a date of the event, a geographic location of the event, a name of the event, an organizer of the event, a performer or presenter at the event, or a sponsor of the event.

11. The system of claim 1, wherein:
the first profile data includes data about one or more of work history of the user, academic history of the user, connections of the user, endorsements of the user, or skills of the user.

12. The system of claim 1, wherein the instructions, when executed by the one or more processors, further cause:
retrieving the first profile data, wherein retrieving the first profile data comprises initiating a first call, to a first service, that includes the viewer identifier as a parameter of the first call;
the first service returns the first profile data;
initiating a second call, to a second service, that is different than the first call and that includes the contextual entity identifier as a parameter of the second call;
the second service returns second profile data.

13. The system of claim 1, wherein the content delivery campaign specifies one or more attributes of a potential viewer and one or more attributes of a potential contextual entity or of a potential entity that is associated with the potential contextual entity.

14. The system of claim 1, wherein the instructions, when executed by the one or more processors, further cause:
retrieving the first profile data from a first data source based on the viewer identifier;
retrieving, based on the contextual entity identifier, second profile data from a second data source that is different than the first data source.

15. A method comprising:
receiving, from a content provider, campaign data that includes targeting criteria, contextual criteria, and particular content;
initiating a content delivery campaign for the content provider based on the campaign data;
based on the targeting criteria and first profile data of a user, associating the user with the content delivery campaign;
after initiating the content delivery campaign, receiving, over a network, a content request that includes (1) a viewer identifier of the user that requested web content hosted by another system and (2) a contextual entity identifier of an entity that is referenced in the web content;
in response to receiving the content request:
identifying, based on the viewer identifier, the one or more contextual criteria, and the contextual entity identifier, the content delivery campaign from among a plurality of content delivery campaigns;
determining the particular content to deliver based on the content delivery campaign;
sending the particular content to a computing device that initiated the content request;
wherein the method is performed by one or more computing devices.

16. The method of claim 15, wherein:
the method further comprising retrieving, based on the contextual entity identifier, second profile data about the entity;
the entity is a second user that is different than the user;
the second profile data includes data about one or more of work history of the second user, employer of the second user, academic history of the second user, connections of the second user, articles published by the second user, endorsements of the second user, or skills of the second user.

17. The method of claim 15, wherein:
the method further comprising retrieving, based on the contextual entity identifier, second profile data about the entity;
the entity is an organization that is not identified in the first profile data;
the second profile data includes data about one or more of a name of the organization, a geographic location of the organization, job openings of the organization, employment numbers of the organization, growth information of the organization, financial information of the organization, or one or more awards received by the organization.

18. The method of claim 15, wherein:
the method further comprising retrieving, based on the contextual entity identifier, second profile data about the entity;
the entity is an academic institution;

the second profile data includes data about one or more of a name of the academic institution, a size of the academic institution, a geographic location of the academic institution, enrollment statistics of the academic institution, sports sponsored by the academic institution, academic degrees offered by the academic institution, one or more national rankings of the academic institution, awards received by the academic institution, or cost of attending the academic institution.

19. The method of claim 15, wherein:

the method further comprising retrieving, based on the contextual entity identifier, second profile data about the entity;

the entity is a group that does not include the user;

the second profile data includes data about one or more of a size of the group, a geographic location of the group, a name of the group, a mission of the group, one or more awards received by the group, one or more upcoming events associated with the group.

20. The method of claim 15, wherein:

the method further comprising retrieving, based on the contextual entity identifier, second profile data about the entity;

the entity is an event;

the second profile data includes data about one or more of a date of the event, a geographic location of the event, a name of the event, an organizer of the event, a performer or presenter at the event, or a sponsor of the event.

* * * * *